(12) United States Patent
Yan et al.

(10) Patent No.: US 10,318,070 B2
(45) Date of Patent: Jun. 11, 2019

(54) TOUCH DETECTOR WITH A CODE DEBUGGER

(71) Applicant: Honeywell International Inc., Morristown, NJ (US)

(72) Inventors: Yu Yan, Shanghai (CN); Jiawei Liu, Shanghai (CN); Jiamin Chen, Shanghai (CN); Xingxin Liu, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 130 days.

(21) Appl. No.: 15/433,057

(22) Filed: Feb. 15, 2017

(65) Prior Publication Data
US 2018/0232100 A1   Aug. 16, 2018

(51) Int. Cl.
| | |
|---|---|
| *G06F 11/36* | (2006.01) |
| *G06F 3/041* | (2006.01) |
| *G02F 1/1333* | (2006.01) |
| *G06F 11/22* | (2006.01) |
| *G06F 3/0488* | (2013.01) |

(52) U.S. Cl.
CPC ........ *G06F 3/0418* (2013.01); *G02F 1/13338* (2013.01); *G06F 3/0412* (2013.01); *G06F 11/2221* (2013.01); *G06F 11/3652* (2013.01); *G06F 11/3664* (2013.01); *G06F 11/3668* (2013.01); *G06F 3/0488* (2013.01)

(58) Field of Classification Search
CPC combination set(s) only.
See application file for complete search history.

(56) References Cited

U.S. PATENT DOCUMENTS

| | | |
|---|---|---|
| 9,154,611 B1 | 10/2015 | Jackson et al. |
| 2013/0139129 A1 | 5/2013 | Lee et al. |
| 2014/0132571 A1 | 5/2014 | Zeng et al. |
| 2016/0232395 A1* | 8/2016 | Han .................. G06F 3/048 |

OTHER PUBLICATIONS

Extended European search report for corresponding EP patent application 18155168.0, dated May 24, 2018.

* cited by examiner

*Primary Examiner* — Van N Chow
(74) *Attorney, Agent, or Firm* — Brooks, Cameron & Huebsch, PLLC

(57) ABSTRACT

A touch detector with a code debugger is provided. The touch detector can include a base, a PCBA with a base-side of the PCBA mounted to the base, a frame mounted to a frame-side of the PCBA, and a debugging device mounted on, coupled to, or soldered to the PCBA for debugging other components soldered to the PCBA. The debugging device can be externally accessible to a user when the base, the PCBA, and the frame are mounted together. The touch detector can also include a battery and/or a USB port, each of which can be externally accessible to the user when the base, the PCBA, and the frame are mounted together.

20 Claims, 1 Drawing Sheet

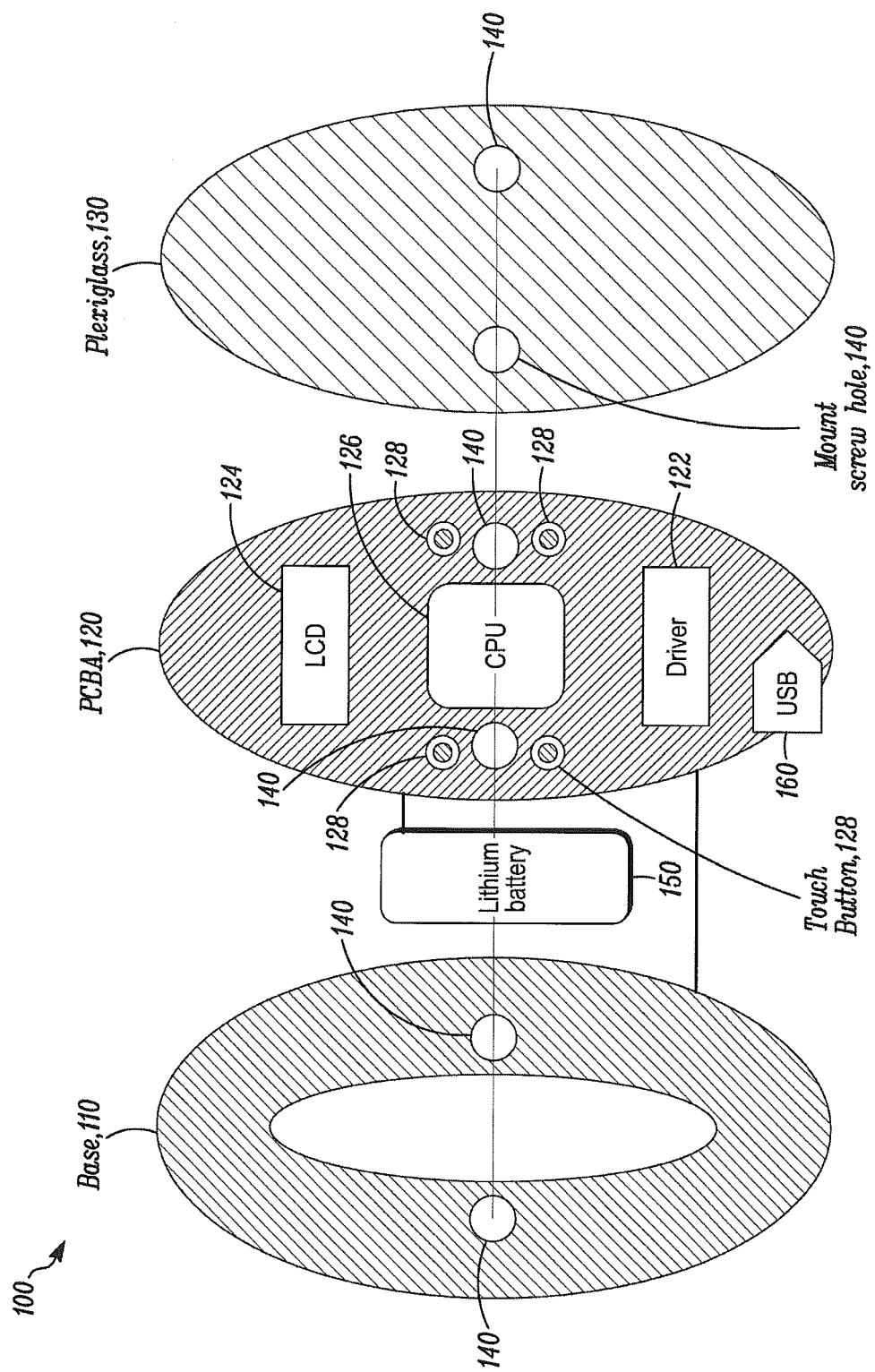

TOUCH DETECTOR WITH A CODE DEBUGGER

FIELD

The present invention relates generally to a touch detector. More particularly, the present invention relates to a touch detector with a code debugger.

BACKGROUND

Touch detectors with a code debugger are known in the art. However, known touch detectors with a code debugger have a large box-type volume, are inconvenient to carry, for example, with a large handle, and operate in a complex manner, for example, with a keyboard or the like. Furthermore, when the battery of a known touch detector with a code debugger needs to be replaced, the shell of the device must be broken or otherwise opened to access the battery. Further still, known touch detectors with code debuggers have compatibility issues when used in connection with different brands of associated devices and cannot be debugged with an online debugging function.

In view of the above, there is a continuing, ongoing need for an improved touch detector with a code debugger.

BRIEF DESCRIPTION OF THE DRAWINGS

FIG. 1 is a block diagram of a system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include a touch detector with a code debugger that is integrally formed, easy to carry, and has a small volume. FIG. 1 is a block diagram of a system 100 in accordance with disclosed embodiments.

As seen in FIG. 1, the system 100 can include a base 110, a printed circuit board assembly (PCBA) 120, and a frame 130. Each of the base 110, the PCBA 120, and the frame 130 can be thin and/or substantially flat and can be fastened together via a screw that can be disposed through corresponding screw holes 140 in each of the base 110, the PCBA 120, and the frame 130. For example, the PCBA 120 can be mounted to the base 110, the frame 130 can be mounted to the PCBA 120, and the mounted structure can be secured together via one or more screws.

The PCBA 120 can have mounted thereon, coupled thereto, or soldered thereto one or more of a microcontroller driver 122, a liquid crystal display (LCD) driver 124, a central processing unit (CPU) 126, and a plurality of sensors 128. In some embodiments, the microcontroller driver 122 can include a 32-bit CPU and/or have an operating frequency of up to approximately 32 MHz. For example, in some embodiments, the microcontroller driver 122 can include the ARM® Cortex®-M3 32-bit CPU. In some embodiments, the LCD display driver 124 can work for up to 8×40 segments, can include an internal 48 MHz phase locked loop (PLL), can include up to twenty capacity sensing channels that can support, for example, touch key, linear, or rotary touch sensors, can include a 12-bit analog-to-digital converter (ADC) with up to twenty-four channels, can include a 12-bit digital-to-analog converter (DAC) with two channels and output buffers, can include one or more ultra-low power comparators with, for example, a window mode and a wake up capability, can include an ultra-low power platform, and/or can include one or more timers.

In some embodiments, the CPU 126 can include a debugger, for example, an executable debugger computer program stored on the non-transitory computer readable medium of the CPU 126. In some embodiments, the CPU 126 can include or have coupled thereto a DIP switch. For example, the DIP switch can receive input, for example, user input, to select a mode of the debugger such that different modes of the debugger can be compatible with different brands of the microcontroller driver 122, the LCD display driver 124, and the sensors 128.

In some embodiments, the CPU 126 can be mounted on a back non-PCBA side of the base 110 so as to be accessible to a user even when the base 110 is mounted to the PCBA 120. In these embodiments, the CPU 126 can be coupled to the PCBA 120 for debugging the microcontroller driver 122 and the LCD display driver 124.

In some embodiments, the CPU 126 can be mounted on, coupled to, or soldered to the PCBA 120. For example, as seen in FIG. 1, the base 110 can have a surface area that is less than the surface area of the PCBA 120. Accordingly, when the PCBA 120 is mounted to the base 110, a portion of the PCBA 120 can remain externally accessible to a user on a base-side of the PCBA 110. In these embodiments, the CPU 126 can be mounted on, coupled to, or soldered to a base-side of the PCBA 120 on a portion of the surface area of the PCBA 120 that is not covered by the base 110 even when the base is mounted to the PCBA 120 so as to be accessible to a user even when the PCBA 120 is mounted to the base 110 and the frame 130 is mounted to the PCBA 120. When mounted on, coupled to, or soldered to the PCBA 120, the CPU 126 can be used for debugging the microcontroller driver 122 and the LCD display driver 124.

As explained above, the PCBA 120 can carry a plurality of sensors 128 mounted on, coupled to, or soldered to the PCBA 120. In some embodiments, one or more of the sensors 128 can include a touch button, and in some embodiments, one or more of the sensors 128 can receive user input through the frame 130.

In some embodiments, the frame 130 can cover and protect the PCBA 120 and the elements on a frame-side thereof when the frame 130 is mounted to the PCBA 120. In some embodiments, the frame 130 can have a smooth surface, and in some embodiments, the frame can be plexiglass.

As seen in FIG. 1, in some embodiments, the system 100 can include a battery 150. In some embodiments, the battery 150 can be rechargeable, and in some embodiments, the battery 150 can be a lithium battery. In any embodiment, the frame 130 need not be broken or otherwise opened to access the battery 150.

For example, in some embodiments, the battery 150 can be mounted on a back, non-PCBA side of the base 110 so as to be accessible to a user even when the base is mounted to the PCBA 120. In these embodiments, the battery 150 can be coupled to the PCBA 120 for powering the microcontroller driver 122, the LCD display driver 124, the CPU 126, and the plurality of sensors 128.

In some embodiments, the battery 150 can be mounted on, coupled to, or soldered to a base-side of the PCBA 120 on a portion of the surface area of the PCBA 120 that is not covered by the base 110 even when the PCBA 120 is mounted to the PCBA 120 so as to be accessible to a user even when the PCBA 120 is mounted to the base 110 and the frame 130 is mounted to the PCBA 120. When mounted on, coupled to, or soldered to the PCBA 120, the battery 150 can power the microcontroller driver 122, the LCD display driver 124, the CPU 126, and the plurality of sensors 128.

As seen in FIG. 1, in some embodiments, the system 100 can also include a USB port 160. The USB port 160 can be accessible to a user for receiving a USB cable for connecting to an Internet-accessible computer outside of the system 100 so that the CPU 126 can execute the debugger computer program with an online function while connected to the Internet and can receive and transmit information via the Internet relevant to the debugging.

For example, in some embodiments, the USB port 160 can be disposed in a back non-PCBA side or an edge-side of the base 110 so as to be accessible to a user even when the base 110 is mounted to the PCBA 120. In these embodiments, the USB port 160 can be coupled to the PCBA 120 for coupling to the CPU 126.

In some embodiments, the USB port 160 can be disposed in a base-side or on an edge-side of the PCBA 120 in a portion of the surface area of the PCBA 120 that is not covered by the base 110 even when the PCBA is 120 mounted to the PCBA so as to be accessible to a user even when the PCBA 120 is mounted to the base 110 and the frame 130 is mounted to the PCBA 120. When disposed in the PCBA 120, the USB port 160 can be coupled to the CPU 126.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A touch detector comprising:
   a base;
   a printed circuit board assembly, wherein a base-side of the printed circuit board assembly is mounted to the base;
   a frame mounted to a frame-side of the printed circuit board assembly; and
   a debugging device mounted on, coupled to, or soldered to the printed circuit board assembly for debugging other components soldered to the printed circuit board assembly,
   wherein the debugging device is externally accessible to a user when the base, the printed circuit board assembly, and the frame are mounted together.

2. The touch detector of claim 1 further comprising one or more screw holes disposed in each of the base, the printed circuit board assembly, and the frame for receiving a screw that secures the base, the printed circuit board assembly, and the frame together.

3. The touch detector of claim 1 further comprising:
   a microcontroller soldered to the frame-side of the printed circuit board assembly; and
   an LCD display driver soldered to the frame-side of the printed circuit board assembly,
   wherein the debugging device debugs the microcontroller and the LCD display.

4. The touch detector of claim 3 further comprising a plurality of sensors mounted on, coupled to, or soldered to the frame-side of the printed circuit board assembly.

5. The touch detector of claim 4 wherein at least one of the plurality of sensors includes a touch button, and wherein each of the plurality of sensors receives input through the frame.

6. The touch detector of claim 4 wherein the frame covers and protects the microcontroller, the LCD display driver, and the plurality of sensors.

7. The touch detector of claim 1 wherein the debugging device includes an executable debugger computer program stored on a non-transitory computer readable medium of a central processing unit.

8. The touch detector of claim 7 further comprising a DIP switch coupled to the central processing unit for receiving input to select one of a plurality of modes of the executable debugger computer program.

9. The touch detector of claim 1 wherein the debugging device is mounted on a side of the base opposite the printed circuit board assembly, and wherein the debugging device is coupled to the printed circuit board assembly.

10. The touch detector of claim 1 wherein a surface area of the base is less than a surface area of the printed circuit board assembly, and wherein a portion of the base-side of the printed circuit board assembly is externally accessible to the user when the base-side of the printed circuit board assembly is mounted to the base.

11. The touch detector of claim 10 wherein the debugging device is mounted on, coupled to, or soldered to the portion of the base-side of the printed circuit board assembly that is externally accessible to the user when the base-side of the printed circuit board assembly is mounted to the base.

12. The touch detector of claim 1 further comprising a battery that is externally accessible to the user when the base, the printed circuit board assembly, and the frame are mounted together.

13. The touch detector of claim 12 wherein the battery is mounted on a side of the base opposite the printed circuit board assembly, and wherein the battery is coupled to the printed circuit board assembly for powering the debugging device and the other components soldered to the printed circuit board assembly.

14. The touch detector of claim 12 wherein a surface area of the base is less than a surface area of the printed circuit board assembly, and wherein a portion of the base-side of the printed circuit board assembly is externally accessible to the user when the base-side of the printed circuit board assembly is mounted to the base.

15. The touch detector of claim 14 wherein the battery is mounted on, coupled to, or soldered to the portion of the base-side of the printed circuit board assembly that is externally accessible to the user when the base-side of the printed circuit board assembly is mounted to the base, and wherein the battery powers the debugging device and the other components soldered to the printed circuit board assembly.

16. The touch detector of claim 1 further comprising a USB port that is externally accessible to the user when the base, the printed circuit board assembly, and the frame are mounted together.

17. The touch detector of claim 16 wherein the USB port is disposed in a back-side of the base opposite the printed circuit board assembly or an edge-side of the base, and wherein the USB port is coupled to the printed circuit board assembly for coupling to the debugging device.

18. The touch detector of claim 17 wherein a surface area of the base is less than a surface area of the printed circuit board assembly, and wherein a portion of the base-side of the printed circuit board assembly is externally accessible to the user when the base-side of the printed circuit board assembly is mounted to the base.

19. The touch detector of claim 18 wherein the USB port is disposed in an edge-side of the printed circuit board assembly or the portion of the base-side of the printed circuit assembly that is externally accessible to the user when the base-side of the printed circuit board assembly is mounted to the base, and wherein the USB port is coupled to the debugging device.

20. The touch detector of claim 17 wherein, when the USB port receives a USB cable connected to an external computer connected to the Internet, the debugger device debugs the components soldered to the printed circuit board assembly with an online function.

* * * * *